UNITED STATES PATENT OFFICE.

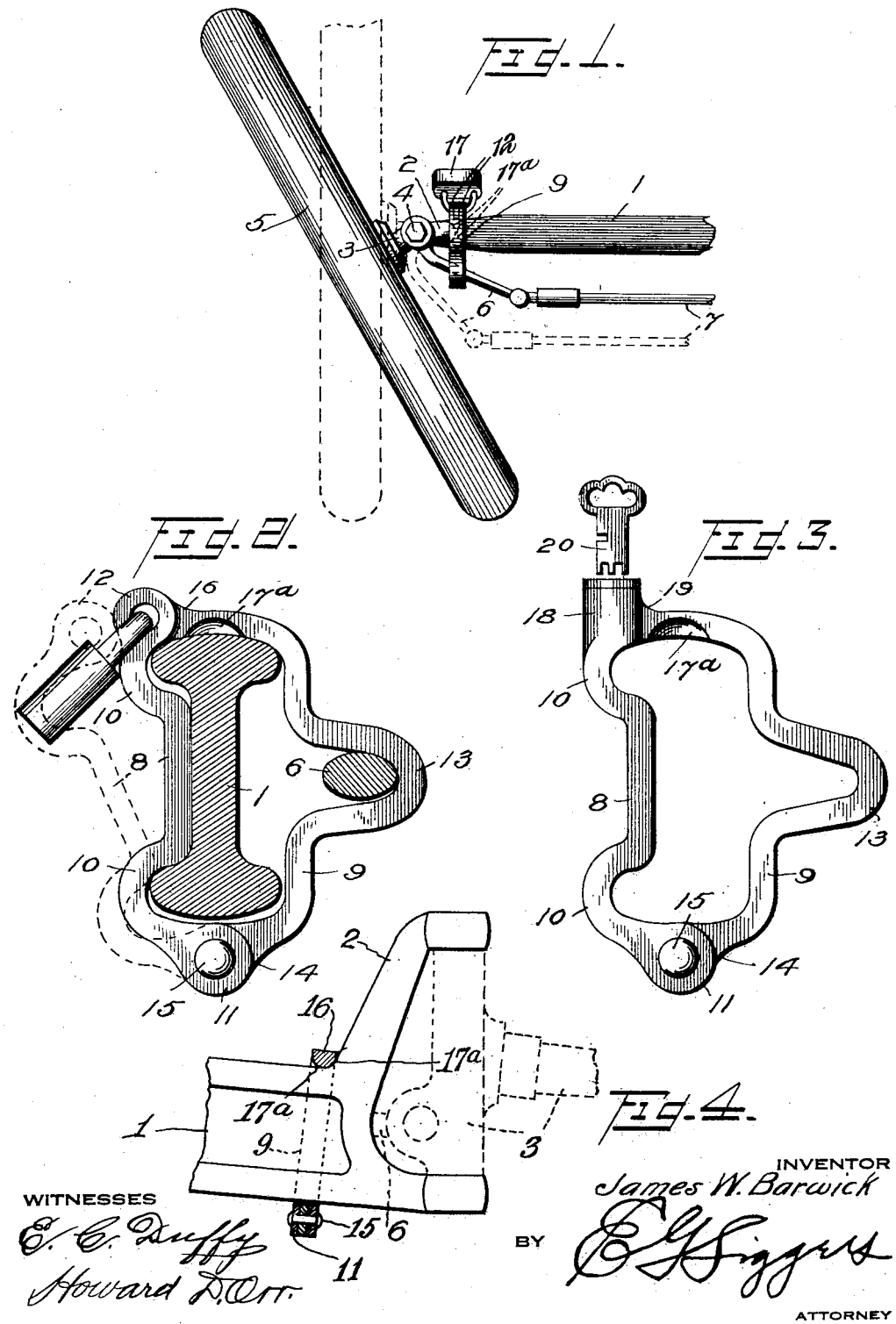

JAMES W. BARWICK, OF PINEPARK, GEORGIA.

AUTOMOBILE-LOCK.

1,396,091.  Specification of Letters Patent.  Patented Nov. 8, 1921.

Application filed May 27, 1920. Serial No. 384,628.

*To all whom it may concern:*

Be it known that I, JAMES W. BARWICK, a citizen of the United States, residing at Pinepark, in the county of Grady and State of Georgia, have invented a new and useful Automobile-Lock, of which the following is a specification.

This invention relates to automobile locks.

The object is to provide a simple and cheaply manufactured lock designed especially for use upon Ford automobiles which may be easily applied to the front axle of the machine in such position as to engage the steering arm of one of the front wheels, after the latter has been turned out of parallelism with the straight-ahead position, in such manner as to bring said arm close to the axle to be held there by the lock.

Another object is to provide a lock having these characteristics which, when properly applied, will cause the car to turn in a continuous circle of small radius in the event an attempt is made to run the car without removing the said lock, as is often done by unauthorized persons.

A full and complete understanding of the invention may be obtained from a consideration of the following detailed description, taken in connection with the accompanying drawing forming a part of this specification, it being understood that while the drawing shows a practical form of the invention, the latter is not confined to any strict conformity therewith, but may be changed and modified so long as such changes and modifications mark no material departure from the salient features of the invention, as expressed in the appended claim.

In the drawing, in which similar reference characters designate corresponding parts throughout the several figures:—

Figure 1 is a detail plan view of the front wheel of a Ford car and a portion of the front axle thereof, having the improved lock applied to the same;

Fig. 2 is an enlarged side elevation of the lock showing in full lines the locked position of the parts of the lock and their relation to the axle and steering arm of the machine, one of said parts being illustrated in partly open position in dotted lines;

Fig. 3 is a similar view of a slightly modified form of locking means embodied in the device.

Fig. 4 is a detail view showing the engagement of the knuckle and recess.

In the Ford automobile, which is in such general use throughout the country, the front wheels are mounted upon spindles formed integrally with a pivoted member which is mounted for swinging movement upon a vertically disposed pivot bolt carried by a knuckle formed on the end of the axle, said pivot member having a rearwardly and inwardly extending steering arm projecting from the same at an angle of about forty-five degrees to the axle, when the wheels are in the straight-ahead position, and these steering arms are connected by a rod which is in turn controlled by the steering wheel of the machine. When the said steering wheel is actuated to turn the front wheels in the extreme position to turn to either the right or the left, one or the other of the steering arms is brought close to and in rear of the front axle and on a level with the horizontal or longitudinal axis thereof. When in this position the arm which has been drawn inwardly toward the center of the machine, is still at a slight angle to the axle and in a position to have the improved lock applied thereto for holding the said arm in its close angular relation to said axle, and thus prevent any steering action upon the front wheels of the machine.

As illustrated in Fig. 1 of the drawing, the front axle 1 of the machine, one end only of which is shown, is provided with the usual knuckle member 2 formed integrally therewith, and having the spindle member 3 mounted for swinging action therein about the vertically disposed bolt 4, the said spindle member having the front wheel 5 mounted thereon in the usual manner. The angularly disposed steering arm 6 extending rearwardly and inwardly from the spindle member 3 is pivotally attached to the end of a connecting arm 7 which is actuated longitudinally by the steering wheel, not shown.

The improved lock comprises a pair of hinged jaws 8 and 9 in the form of castings made of some suitable metal strong enough to withstand the strain to which the device may be subjected, and comprising arms or bars adapted to surround the axle 1 and the arm 6 to hold the same from separation.

The jaw 8 is provided at its upper and lower end portions with outwardly curved or bowed terminals 10 adapted to receive the enlarged heads of the front axle 1, which is of the usual I-beam formation, the straight, central body portion of the jaw 8 being adapted to bear against the front side or web of said axle between the upper and lower heads thereof, as clearly shown in Fig. 2 of the drawing.

At the lower end, the jaw 8 is extended below the axle and is provided with a pivot eye 11, the center of which is directly below the center of said axle, and at the upper end the jaw 8 is provided with a pair of spaced, upstanding eyes 12.

The jaw 9 which is arranged in opposed relation to the first-named jaw and at the rear of the axle 1, is provided at its central portion with a rearwardly extending loop 13 adapted to engage against the rear side of the steering arm 6 and hold the same in its relation to the axle. The lower end of the jaw 9 is provided with an eye 14 adapted to register with the eye 11 of the other jaw, and to receive a pivot 15 in the form of a rivet suitably headed over, to prevent its removal for the purpose of surreptitiously disengaging the lock from the machine, in the event of an attempt to steal the same.

The jaw 9 is further equipped, at its upper end, with an eye 16 formed by reducing the metal at each side so that the said eye 16 will freely pass between the eyes 12, the registering apertures of the same being adapted to receive the shackle of an ordinary pad-lock 17, which serves to effectually prevent the separation of the jaws and their removal from surrounding relation to the front axle and steering arm.

By reason of the angular relation of the steering arm 6 to the axle 1, it will be seen that the locking jaws 8 and 9, when secured by the pad-lock, may not move longitudinally of the axle toward the center of the car, and it will be further seen, by reference to Fig. 1 of the drawing, that the locking device is placed adjacent to the upwardly extendng portion of the knuckle member 2 in such manner as to prevent any longitudinal movement of the jaws along the axle away from the center of the car or toward the wheel 5. In order to assist in the rigid seating of the device upon the axle, a slight indentation or hollow 17ª is provided in each face of the upper portion of the jaw 9 where extending across the top of the axle, for the reception of said knuckle member 2, at either side of the machine.

The front jaw 8, by reason of the central portion thereof bearing against the front face of the axle, is amply provided with bearing surface to take the strain of any excessive pressure which might be brought to bear upon the same, and it will be seen that a smple, efficient and durable locking device has been provided for Ford automobiles, which may be quickly applied in a position to avoid soiling the clothing or the hands of the operator, said locking means effectually preventing the machine from traveling straight away, and causing the machine to turn in a continuous circle of small radius thus giving due notice that the machine is being maliciously tampered with.

In Fig. 3, in which is illustrated the modified form of the invention, the jaws 8 and 9 are similar to those already described, the eyes 12 and 16, however, being omitted, the jaw 8 having instead a vertically disposed, elongated extension, in the form of a barrel 18 in which any suitable locking mechanism may be installed and the jaw 9 having at its free terminal 19 any suitable form of projection adapted to extend through an opening in the side of the barrel to engage with the locking mechanism and to be held thereby, or be released from the same through the medium of the proper key 20.

What is claimed is:

An automobile lock comprising two hinged jaws adapted to surround the front axle and the steering arm of a car adjacent the knuckle joint of either front wheel with the hinge of said jaws located beneath the axle when the lock is in position, each jaw comprising a continuous bar, the front jaw being formed with an intermediate upright flat portion to bear against the front side of the axle, and upper and lower bowed portions to receive the flanges of the axle, the rear jaw having an intermediate continuous loop to engage the steering arm, the end sections of the rear jaw engaging about the flanges of the axle, the upper end of the rear jaw having an indentation to seat the knuckle member whereby the device is held rigidly on the axle and prevented from sliding movement thereon when an attempt is made to steer the automobile, and means for connecting the upper ends of said jaws above the axle, said means including a locking mechanism to prevent the separation of the jaws and consequently of the axle and steering arm whereby the steering arm is held immovable and steering of the automobile is made impossible.

In testimony that I claim the foregoing as my own, I have hereto affixed my signature.

JAMES W. BARWICK.